(12) United States Patent
Nakane et al.

(10) Patent No.: US 8,318,630 B2
(45) Date of Patent: Nov. 27, 2012

(54) CATALYST FOR REMOVING NITROGEN OXIDES AND METHOD FOR REMOVING NITROGEN OXIDES USING THE SAME

(75) Inventors: Takuji Nakane, Himeji (JP); Naohiro Kato, Himeji (JP); Akihisa Okumura, Himeji (JP)

(73) Assignees: ICT Co., Ltd., Osaka-Shi, Osaka (JP); International Catalyst Technology, Inc., Auburn Hills, MI (US)

( * ) Notice: Subject to any disclaimer, the term of this patent is extended or adjusted under 35 U.S.C. 154(b) by 117 days.

(21) Appl. No.: 12/740,051

(22) PCT Filed: Oct. 29, 2008

(86) PCT No.: PCT/JP2008/069666
§ 371 (c)(1), (2), (4) Date: Jun. 9, 2010

(87) PCT Pub. No.: WO2009/057650
PCT Pub. Date: May 7, 2009

(65) Prior Publication Data
US 2010/0260652 A1    Oct. 14, 2010

(30) Foreign Application Priority Data
Oct. 29, 2007 (JP) ................. 2007-280253

(51) Int. Cl.
| | | |
|---|---|---|
| B01J 23/00 | (2006.01) | |
| B01J 23/10 | (2006.01) | |
| B01J 29/06 | (2006.01) | |
| B01J 23/32 | (2006.01) | |
| B01J 23/70 | (2006.01) | |
| B01J 23/74 | (2006.01) | |
| B01J 23/48 | (2006.01) | |
| B01J 8/02 | (2006.01) | |
| B01J 8/00 | (2006.01) | |
| B01D 53/56 | (2006.01) | |
| B01D 53/94 | (2006.01) | |
| B01D 53/86 | (2006.01) | |
| C01B 21/00 | (2006.01) | |
| C01B 23/00 | (2006.01) | |
| C01B 25/00 | (2006.01) | |
| C01B 31/00 | (2006.01) | |
| C01B 33/00 | (2006.01) | |
| C01B 35/00 | (2006.01) | |
| C01G 28/00 | (2006.01) | |
| C01G 30/00 | (2006.01) | |

(52) U.S. Cl. .......... 502/304; 502/65; 502/324; 502/325; 502/337; 502/338; 502/345; 423/213.2; 423/239.2

(58) Field of Classification Search ................. 502/304, 502/324, 325, 337, 338, 345, 60, 65, 66, 502/73, 74; 423/213.2, 236, 239.2
See application file for complete search history.

(56) References Cited

U.S. PATENT DOCUMENTS
4,961,917 A    10/1990    Byrne
(Continued)

FOREIGN PATENT DOCUMENTS
EP    1 468 721    10/2004
(Continued)

OTHER PUBLICATIONS

English Translation of PCT Notification Concerning Transmittal of International Preliminary Report on Patentability for International Application No. PCT/JP2008/069666, dated Jun. 10, 2010, 15 pages.

*Primary Examiner* — Colleen Dunn
*Assistant Examiner* — Anthony J Zimmer
(74) *Attorney, Agent, or Firm* — Occhiuti Rohlicek & Tsao LLP

(57) ABSTRACT

The present invention provides a catalyst which can sufficiently remove nitrogen oxides in an exhaust gas. The catalyst for removing nitrogen oxides to achieve an object of the present invention includes a monolithic support which is coated with a lower layer containing a catalytic component A comprising cerium oxide and an upper layer containing a catalytic component B comprising at least one kind of metal selected from a group consisting of copper, manganese, iron, cobalt and nickel or a compound thereof, and zeolite.

9 Claims, 3 Drawing Sheets

U.S. PATENT DOCUMENTS

| | | | |
|---|---|---|---|
| 5,141,906 A | | 8/1992 | Takeshima et al. |
| 5,354,720 A | * | 10/1994 | Leyrer et al. ............... 502/64 |
| 5,427,989 A | * | 6/1995 | Kanesaka et al. ............ 502/66 |
| 5,681,788 A | | 10/1997 | Kanesaka et al. |
| 5,795,840 A | * | 8/1998 | Takami et al. ............. 502/327 |
| 5,972,821 A | * | 10/1999 | Nojima et al. ............... 502/66 |
| 6,066,587 A | * | 5/2000 | Kurokawa et al. ........... 502/66 |
| 6,221,804 B1 | | 4/2001 | Yamada et al. ............. 502/326 |
| 6,395,675 B1 | * | 5/2002 | Suga et al. ................. 502/326 |
| 6,667,018 B2 | * | 12/2003 | Noda et al. ............... 423/213.5 |
| 6,713,031 B2 | * | 3/2004 | Harris et al. ............. 423/239.1 |
| 6,750,168 B2 | * | 6/2004 | Yan et al. ..................... 502/79 |
| 6,756,336 B2 | * | 6/2004 | Kasahara et al. ............ 502/65 |
| 7,150,866 B2 | * | 12/2006 | Wieland et al. ............. 423/652 |
| 7,662,743 B2 | * | 2/2010 | Satoh et al. ................ 502/302 |
| 7,906,449 B2 | * | 3/2011 | Ando et al. ................... 502/66 |
| 2001/0049337 A1 | * | 12/2001 | Kurokawa et al. .......... 502/325 |
| 2001/0053340 A1 | * | 12/2001 | Noda et al. ............... 423/213.2 |
| 2002/0068679 A1 | * | 6/2002 | Yan et al. ..................... 502/66 |
| 2008/0026932 A1 | * | 1/2008 | Satoh et al. .................. 502/73 |
| 2008/0286184 A1 | * | 11/2008 | Ando et al. ............... 423/213.5 |

FOREIGN PATENT DOCUMENTS

| | | | |
|---|---|---|---|
| EP | 1 685 891 | | 8/2006 |
| JP | 01-127044 | | 5/1989 |
| JP | 01127044 A | * | 5/1989 |
| JP | 04-197446 | | 7/1992 |
| JP | 04197446 A | * | 7/1992 |
| JP | 06-190282 | | 7/1994 |
| JP | 06190282 A | * | 7/1994 |
| JP | 06262089 A | * | 9/1994 |
| JP | 2001-123827 | | 5/2001 |
| JP | 2001123827 A | * | 5/2001 |
| JP | 2006-326437 | | 12/2006 |
| JP | 2006326437 A | * | 12/2006 |
| WO | 2006/109849 | | 10/2006 |

* cited by examiner

CATALYST FOR REMOVING NITROGEN OXIDES AND METHOD FOR REMOVING NITROGEN OXIDES USING THE SAME

TECHNICAL FIELD

The present invention relates to removal of nitrogen oxides in an exhaust gas. In more detail, the present invention relates to a catalyst aiming at removing harmful components, in particular, nitrogen oxides (NOx) in an exhaust gas from gasoline engines and diesel engines, and a method for removing nitrogen oxides.

BACKGROUND ART

NOx in the atmosphere causes photochemical smog and acid rain. For that reason, emission of NOx from mobile emission sources such as automobiles equipped with internal combustion engines such as gasoline engines and diesel engines, which is one of the NOx emission sources, has become a social problem. Concerning the emission amount of NOx, an investigation has been promoted toward tightening its regulation in future. Therefore, studies to develop a catalyst for exhaust gas purification are attracting attention.

As for removal of nitrogen oxides in an exhaust gas, various technologies have been provided, in particular, many technologies using a zeolite-based catalyst have been reported. For example, U.S. Pat. No. 4,961,917 discloses a method for removing nitrogen oxides by using iron or copper and zeolite (ZSM-20, β, Y type) as a catalyst and $NH_3$ as a reducing agent at 250 to 600° C. In addition, U.S. Pat. No. 5,141,906 discloses an catalyst for exhaust gas purification, which is obtained by forming a wash-coat layer containing zeolite (ZMS-5) ion-exchanged with copper or cobalt on the wall surface of a honeycomb support made of ceramics, followed by heat treatment in a gas stream containing a sulfur compound. Here, as zeolite, those of ZSM-5, ZSM-20, type β, type Y, and the like are generally used.

DISCLOSURE OF THE INVENTION

However, although the conventional technologies such as U.S. Pat. No. 4,961,917 or U.S. Pat. No. 5,141,906 exhibited a certain effect at an exhaust gas temperature of 250° C. or higher, the effect became less at a lower exhaust gas temperature, and hence they were not one which could treat nitrogen oxides in an exhaust gas sufficiently. In particular, when regulation for the exhaust gas is tightened, such nitrogen oxides treatment technologies are insufficient. In addition, as another technology, there is a method for removing nitrogen oxides utilizing an aqueous urea solution and using ammonia resulting from its chemical reaction as a reducing agent, but in such a method, hydrolysis of urea hardly occurs and byproducts tend to be easily formed at a temperature of 160° C. or lower. Therefore, it is difficult to remove nitrogen oxides utilizing an aqueous urea solution.

Therefore, the present invention has been made considering the above circumstance, and an object of the present invention is to provide a catalyst, which can sufficiently remove nitrogen oxides in an exhaust gas.

Another object of the present invention is to provide a catalyst, which can sufficiently remove nitrogen oxides in an exhaust gas even at a lower exhaust gas temperature.

In addition, another object of the present invention is to provide a method, by which nitrogen oxides in an exhaust gas can be sufficiently removed even at a lower exhaust gas temperature.

The present inventors have studied intensively to solve the above problem, and finally found that nitrogen oxides in an exhaust gas can be effectively removed by forming firstly a lower layer containing cerium oxide on a support, and further forming an upper layer containing a transition metal and zeolite on the above lower layer, and thereby adsorbing nitrogen dioxide occurred by an oxidation reaction in the upper layer by cerium oxide in the lower layer. In addition, the present inventors have found that the catalyst having the above structure exhibits a superior catalytic activity even at such a low temperature condition as around 80 to 150° C. Based on the above knowledge, the present invention has been completed.

Thus, the above object of the present invention can be achieved by a catalyst for removing nitrogen oxides, wherein a monolithic support is coated with a lower layer containing a catalytic component A including cerium oxide and an upper layer containing a catalytic component B including at least one kind of metal selected from a group consisting of copper, manganese, iron, cobalt and nickel or oxide thereof, and zeolite.

In addition, the above another object of the present invention can be achieved by a method for removing nitrogen oxides in an exhaust gas, in which an exhaust gas containing nitrogen oxides is contacted with the catalyst for removing nitrogen oxides of the present invention.

By using the catalyst of the present invention, nitrogen oxides in an exhaust gas can be sufficiently removed from exhaust gas even at a low treatment temperature (for example, around 80 to 150° C.).

BEST MODE FOR CARRYING OUT THE INVENTION

First aspect of the present invention is to provide a catalyst for removing nitrogen oxides, wherein a monolithic support is coated with a lower layer containing a catalytic component A including cerium oxide and an upper layer containing a catalytic component B including at least one kind of metal selected from a group consisting of copper, manganese, iron, cobalt and nickel or oxide thereof, and zeolite. The catalytic components A and B can exhibit more remarkable removing actions for nitrogen oxides by locating them in the lower layer and the upper layer, respectively, in comparison with the case when each of the catalytic components A or B is used alone in a single layer. Therefore, the above effect can be significantly exhibited by coating (applying) a monolithic support commonly used for automobile catalysts with each of the catalytic components A and B in a separate layer. Detailed mechanism thereof is not clear, but considered as follows. The catalytic component B catalyzes the oxidation reaction and promotes the oxidation of nitrogen oxides, in particular, nitric monoxide (NO) to nitrogen dioxide ($NO_2$), and further nitrogen dioxide formed in the upper layer is adsorbed by cerium oxide in the lower layer. In this connection, the present invention is not limited by the above speculative theory. For this reason, by using the catalyst of the present invention, amount of nitrogen oxides (NOx) can be significantly reduced/removed.

In addition, the catalytic components A and B according to the present invention can exhibit sufficient catalytic activities even at such a low temperature range as around 100° C., for example, 80 to 150° C. It is considered that this is because nitrogen dioxide adsorbed in the lower layer containing the catalytic component A including cerium oxide is retained in the catalyst without being released from the catalyst in the temperature range. For this reason, by contacting the catalyst of the present invention with exhaust gas containing nitrogen oxides even at a low temperature in a range of around 100° C., for example, 80 to 150° C., the amount of nitrogen oxides (NOx) in an exhaust gas can be significantly reduced/removed. However, since nitrogen dioxide adsorbed in the catalyst is released and emitted as NOx by exposure to the exhaust gas at a temperature of 150° C. or higher, it is necessary to remove efficiently this released NOx. By using the catalyst of the present invention, nitrogen oxides in an exhaust gas can be significantly reduced/removed without releasing adsorbed NOx again by using ammonia and hydrocarbons as a reducing agent. Further, by combining the catalyst of the present invention with other catalyst, hydrocarbons, carbon monoxide and soot in addition to nitrogen oxides in an exhaust gas can be effectively removed.

Hereinafter, embodiments of the present invention will be explained.

1. Catalytic Component A

In the present invention, the catalytic component A contained in the lower layer includes cerium oxide as an essential component. Cerium oxide located in the lower layer can significantly reduce/remove emission amount of NOx, due to its efficient adsorption of nitrogen dioxide ($NO_2$) generated in the upper layer. Here, as for cerium oxide, not only cerium oxide itself but those which can be converted to cerium oxide by heating can be used. Those which can be converted to cerium oxide by heating include, for example, water-soluble cerium salts such as cerium hydroxide, cerium nitrate, cerium acetate and cerium carbonate.

In addition, cerium oxide is not particularly limited in shape, specific surface area etc. thereof, but it is preferably to be able to sufficiently adsorb nitrogen dioxides generated in the upper layer. Cerium oxide can have a form of, for example, granular, particulate, powdery, cylindrical, conical, prismatic, cubic, pyramidal, amorphous, and the like. Preferably cerium oxide is granular, particulate or powdery. Average particle diameter of cerium oxide in granular, particulate or powdery form is not particularly limited, but in a range of, for example, preferably 1.0 to 100 μm, and more preferably 1.0 to 20.0 μm. In this connection, "average particle diameter" of cerium oxide in the present invention can be determined by an average value of particle diameters of cerium oxide measured by a known method such as classification.

In addition, BET specific surface area of cerium oxide may be such an area to be able to adsorb nitrogen dioxide generated in the upper layer, preferably 100 to 300 $m^2/g$, and more preferably 200 to 300 $m^2/g$. When the specific surface area is in the above range, cerium oxide can sufficiently adsorb nitrogen dioxide generated in the upper layer.

In the present invention, the catalytic component A may be composed of cerium oxide only, but it may further include other component (hereinafter, also called as "other component A'"). Here, cerium oxide may be includes in the lower layer in a form of a mixture with other component A', or in a form in which cerium oxide coated the other component A' (including a form in which cerium oxide is supported on the other component A'). When cerium oxide is used in a form in which cerium oxide coated the other component A', the coating method is not particularly limited, and any known method can be used. Specifically, such a method as impregnation method, ion exchange method, mixing method, and the like can be preferably used.

In addition, other component A' which can be used when component A includes other component A' includes preferably refractory inorganic oxide, more specifically aluminium oxide ($Al_2O_3$), silicon oxide ($SiO_2$), titanium oxide ($TiO_2$), zirconium oxide ($ZrO_2$), phosphorus oxide ($P_2O_5$), phosphate zeolite, and the like. Among them, aluminium oxide, silicon oxide (silica), and zirconium oxide are preferable, and silicon oxide and aluminium oxide are more preferable. In this case, other component A' may be used alone or in a form of a mixture of two or more components. In addition, other component A' may be used in a form of oxide as described above, or those which can form such oxides by heating may be used. In the latter case, hydroxides, nitrates, halides such as chloride, acetates, sulfates, carbonates etc. of the above aluminium, silicon, titanium, zirconium and phosphorus can be used. In addition, amount of other component A' to be used (added) when other component A' is used is not particularly limited, so long as it is amount in which other component A' does not inhibit the above action by cerium oxide, and is preferably 2 to 100 parts by mass, more preferably 5 to 50 parts by mass relative to 100 parts by mass of cerium oxide.

In the present invention, abundance of catalytic component A in the catalyst of the present invention is not particularly limited, so long as it is amount in which the above effect can be exhibited. Preferably, catalytic component A is included at the amount of 10 to 200 g, more preferably 50 to 150 g, and further more preferably 90 to 150 g per 1 liter of monolithic support.

2. Catalytic Component B

In the present invention, catalytic component B contained in the upper layer includes at least one kind of metal selected from a group consisting of copper, manganese, iron, cobalt and nickel or metal compound thereof (hereinafter, also called as "catalytic component B-2") and zeolite (hereinafter, also called as "catalytic component B-1") as essential components. Catalytic component B has an action to accelerate the reaction to oxidize nitrogen oxides, in particular, nitric monoxide (NO) in an exhaust gas to nitrogen dioxide ($NO_2$).

Zeolite (catalytic component B-1) may be any type, so long as it is generally a crystalline aluminosilicate having a zeolite skeletal structure, and any known type of zeolite can be used. Zeolite includes, for example, β type (β-zeolite), Y type, ZSM-5 (synthesized zeolite), ZSM-20 (synthesized zeolite), ferrierite, faujasite, mordenite, and the like. Among them, β type (β-zeolite), ZSM-5, and the like are preferable, and β type (β-zeolite) is more preferable.

Here, zeolite is a material having specific porous structure and solid acid property, and this structure has been found to be preferable for the NOx purification action. For this reason, preferably zeolite has an appropriate porous structure and an appropriate strength and/or amount of acid.

In these features, the acid property (acid strength) of zeolite is generally represented by a ratio of Si and Al [$SiO_2/Al_2O_3$ (molar ratio)] which are constituents thereof. If zeolites have the same structure, it is said that amount of acid becomes more (acid strength becomes higher) as Al content becomes higher. Here, smaller $SiO_2/Al_2O_3$ (molar ratio) is generally preferable, in view of amounts of ammonia ($NH_3$) and hydrocarbons (HC) to be adsorbed. For this reason, zeolite to be used in the present invention preferably has an appropriate $SiO_2/Al_2O_3$ (molar ratio). More specifically, zeolite to be used in the present invention has a $SiO_2/Al_2O_3$ (molar ratio) of preferably 10 to 100, and more preferably 10 to 50. In this case, $SiO_2/Al_2O_3$ (molar ratio) less than the lower limit may cause poor hydrothermal durability. In addition, $SiO_2/Al_2O_3$ (molar ratio) over the upper limit may cause poor adsorption performances of ammonia ($NH_3$) and hydrocarbons (HC), resulting in failing to remove efficiently nitrogen oxides.

In addition, in the present invention, zeolite may be a proton type zeolite. In addition, the proton type zeolite may be in a form partly modified with cerium, lanthanum, phosphorus, boron, gallium, magnesium, calcium or barium, preferably cerium, lanthanum, phosphorus, boron and gallium (herein, also collectively called as "modifying component C-1"), and the like. In this connection, "modification" means that [$SiO_2/Al_2O_3$ (molar ratio)] is varied by ion exchange, supporting by dipping, exchange of Al ion in skeletal structure, and the like, to improve heat resistance. When the modification as described above is carried out, amount of modifying component C-1 is not particularly limited, so long as the desired effect (for example, improvement of heat resistance) can be achieved, but is preferably 0.1 to 5.0 parts by mass relative to 100 parts by mass of zeolite. In addition to or instead of the above modification, zeolite may be modified using at least one kind of metal selected from a group consisting of copper, cobalt and manganese (herein, also collectively called as "modifying component C-2"). By such modification, deposit such as carbon accumulated in the pores of zeolite during use can be removed. When such modification as described above is carried out, amount of modifying component C-2 is not limited, and may be suitably selected considering the desired effect (for example, removal of deposit such as carbon). For example, amount of modifying component C-2 is preferably around 1.0 to 10 parts by mass relative to 100 parts by mass of zeolite.

In this connection, in the present invention, the above zeolite may be used alone or in a form of a mixture of two or more types.

In the present invention, catalytic component B-1 is not particularly limited in shape or size thereof. Catalytic component B-1 can have a form of, for example, granular, particulate, powdery, cylindrical, conical, prismatic, cubic, pyramidal, amorphous, and the like. Preferably catalytic component B-1 is granular, particulate or powdery. When catalytic component B-1 is granular, particulate or powdery, average particle diameter of catalytic component B-1 is not particularly limited, but preferably in a range of 10 to 2,000 nm. Here, "average particle diameter" of catalytic component B-1 in the present invention can be determined by an average value of particle diameters of the catalytic component measured by electron microscopic images.

In addition, catalytic component B-2 is at least one kind of metal selected from a group consisting of copper, manganese, iron, cobalt and nickel or metal compound thereof. Among them, metal or metal compound containing iron is preferable. These catalytic component B-2 can accelerate effectively the conversion from nitrogen oxides, in particular, nitric oxide to nitrogen dioxide (oxidation reaction), especially when it is used in combination with the above catalytic component B-1. Here, catalytic component B-2 may be used alone or in a form of a mixture of two or more kinds, or alternatively in a form of alloy containing at least one of these kinds. In addition, each metal component of catalytic component B-2 may be in a form of metal itself or metal compound. In this case, the metal compound includes salts such as halide (for example, chloride), acetate, nitrate, sulfate, ammonium salt, amine salt, carbonate, bicarbonate, nitrite, oxalate, formate; hydroxide; alkoxide; oxide; and the like, and oxide, nitrate, acetate, and the like are preferable.

In addition, in the present invention, mixing ratio of catalytic components B-1 and B-2 is not particularly limited, so long as the conversion (oxidation reaction) from nitrogen oxides, in particular, nitric oxide to nitrogen dioxide can be accelerated. Preferably, amount of catalytic component B-2 is in a range of 1.0 to 30.0 parts by mass, more preferably 3.0 to 10.0 parts by mass relative to 100 parts by mass of catalytic component B-1. Here, when amount of catalytic component B-2 exceeds the above upper limit (catalytic component B-2 is excessively present), there is a possibility that removal efficiency for NOx (nitrogen oxides) may be decreased if the catalyst is exposed to a temperature of 450° C. or higher in removal of nitrogen oxides with a reducing agent. By contraries, when amount of catalytic component B-2 is less than the above lower limit (catalytic component B-1 is excessively present), conversion efficiency from NO to $NO_2$ by the catalyst may be decreased, resulting in decrease in removal efficiency for NOx. In this connection, in the present invention, amount of catalytic component B-2 is described as amount of the metal itself when catalytic component B-2 is metal itself, and as converted amount to metal oxide when catalytic component B-2 is in other form (for example, nitrate salt or the like), if not otherwise specified.

In the present invention, catalytic components B-1 and B-2 may be contained in the upper layer in a form of a mixture, or in a form in which catalytic component B-2 is coated (including supported) with catalytic component B-1, however, catalytic component B-2 may be coated (including supported) with catalytic component B-1, considering accelerating performance for the conversion (oxidation reaction) from nitrogen oxides, in particular, nitric oxide (NO) to nitrogen dioxide ($NO_2$). When catalytic component B-2 is coated (including supported) with catalytic component B-1, method for coating catalytic component B-2 on catalytic component B-1 is not particularly limited, and any known method can be used. Specifically, such a method as impregnation method, ion exchange method, mixing method, and the like can be preferably used.

In the present invention, the catalytic component B may be composed of the above catalytic components B-1 and B-2 only, or may further include other component (hereinafter, also called as "other component B'"). Here, the catalytic components B-1 and B-2 may be contained in the upper layer in a form of a mixture with the other component B', or in a form in which at least one of the catalytic components B-1 and B-2 coats on the other component B' (including a form in which at least one of the catalytic components B-1 and B-2 is supported on the other component B'). When they are used in a form in which at least one of the catalytic components B-1 and B-2 coats on the other component B', coating method is not particularly limited, and any known method can be used. Specifically, such a method as impregnation method, ion exchange method, mixing method, and the like can be preferably used.

In addition, other component B' to be used when catalytic component B includes other component B' is preferably refractory inorganic oxide, and more specifically it includes aluminium oxide ($Al_2O_3$), silicon oxide ($SiO_2$), titanium oxide ($TiO_2$), zirconium oxide ($ZrO_2$), phosphorus oxide ($P_2O_5$), phosphoric acid zeolite, and the like, among them, aluminium oxide, silicon oxide (silica), phosphorus oxide, titanium oxide and zirconium oxide are preferable, and silicon oxide, aluminium oxide and titanium oxide are more preferable. In this case, other component B' may be used alone or in a form of a mixture of two or more components. In addition, other component B' may be used in a form of oxide as described above, or those which can form such oxide by heating may be used. In the latter case, hydroxide, nitrate, halide such as chloride and the like, acetate, sulfate, carbonate, and the like of the above aluminium, silicon, titanium, zirconium and phosphorus can be used. In addition, amount of other component B' to be used (added) when other component B' is used is not particularly limited, so long as other component B' does not inhibit the effect of catalytic components B-1 and B-2, and is preferably 10 to 100 parts by mass, more preferably 10 to 50 parts by mass relative to 100 parts by mass of total amount of catalytic component B-1 (zeolite) and catalytic component B-2 (metal or metal compound).

In addition, in the present invention, abundance ratio of catalytic component A in the lower layer and catalytic component B in the upper layer is not particularly limited, so long as nitrogen oxides, in particular, nitric oxide (NO) in an exhaust gas is efficiently converted to nitrogen dioxide ($NO_2$) in the upper layer, and nitrogen dioxide ($NO_2$) thus generated in the upper layer is efficiently adsorbed in the lower layer in such ratio. Specifically, catalytic component A is present in a range of preferably 10 to 100 parts by mass, more preferably 50 to 100 parts by mass relative to 100 parts by mass of catalytic component B. In particular, as for ratio by mass of amount of cerium oxide in the lower layer and total amount of catalytic components B-1 and B-2 in the upper layer, cerium oxide is present in a range of preferably 10 to 100 parts by mass, more preferably 50 to 100 parts by mass relative to 100 parts by mass of total amount of catalytic components B-1 and B-2. Here, when catalytic component A is excessively present, since conversion performance of nitrogen oxides, in particular, nitric oxide (NO) in an exhaust gas to nitrogen dioxide ($NO_2$) is too low compared to adsorption performance for nitrogen dioxide of cerium oxide, removing performance of nitrogen oxides in an exhaust gas may be insufficient, and in addition, efficient removal of the desorbed NOx may be impossible. By contraries, when catalytic component B is excessively present, corresponding amount of nitrogen oxides to the conversion performance of nitrogen oxides, in particular, nitric oxide (NO) in an exhaust gas to nitrogen dioxide ($NO_2$) may fail to be absorbed in the lower layer.

In the present invention, abundance of catalytic component B in the catalyst of the present invention is not particularly limited, so long as the effect described above can be exhibited in such amount. Catalytic component B is contained in an amount of preferably 100 to 300 g, more preferably 150 to 250 g per 1 liter of monolithic support.

3. Monolithic Support

In the present invention, the monolithic support is not particularly limited, and any known one can be used. Specifically, as the monolithic support, flow-through type in which gas can pass through directly and filter type which can filter off soot in an exhaust gas can be used.

Here, when the monolithic support is the flow-through type, the monolithic support is also not particularly limited, and any known one can be used. Specifically, the monolithic support includes cylindrical monolithic support, which has many through-holes passing through in the axis direction, such as those having honeycomb, metal honeycomb, plug honeycomb, metal mesh and corrugated shapes; foam type monolithic support, and the like. Honeycomb type monolithic support and corrugated type monolithic supports are preferably used, and honeycomb type monolithic support is particularly preferably used.

In addition, when the monolithic support is the honeycomb type or the corrugated type, the monolithic support has multiple holes, in this case, structure and production method thereof are not particularly limited, and those similar to known structures can be used. For example, the monolithic support can be produced by extrusion molding method, a method in which a sheet-like element is rolled up tightly, or the like. In addition, shape of the gas passing inlet (shape of cell) of the monolithic support may be any shape of hexagonal, quadrangular, trigonal and corrugated shapes. Cell density (cell number/unit cross-section) enough for use is 100 to 600 cells/square inch.

Material of the monolithic support is not particularly limited, and the same materials as those usually used can be used. For example, honeycomb supports made of a material such as cordierite, mullite, petalite, alumina (α-alumina), silica, zirconia, titania, titanium phosphate, aluminium titanate, spodumene, alumino silicate, magnesium silicate, zeolite, silica, and the like are preferable, and among them, cordierite type is particularly preferable. Besides these, those having a monolithic structure using an oxidation-resistant heat resistant metal such as stainless steel, Fe—Cr—Al alloy are used as well.

In addition, when the monolithic support is those of the filter type, the monolithic support has fine pores in the wall, and can filter off soot allowing gas to pass through the wall. In addition, in the filter type, there is the one in which holes in the exhaust gas inlet side of the support are closed up in checkered pattern, and the holes not closed up in the exhaust gas inlet side are closed up in the outlet side and the holes closed up in the exhaust gas inlet side are not closed up in the outlet side.

4. Production Method of the Catalyst for Removing Nitrogen Oxides of the Present Invention Production method of the catalyst for removing nitrogen oxides of the present invention is not particularly limited, and a method similar to or suitably modified from the known methods can be used. Alternatively, the above method can be used alone or in suitable combination. Hereinafter, preferable embodiments of the production method of the catalyst for removing nitrogen oxides of the present invention will be explained, but the present invention is not limited to the following methods.

Specified amounts of cerium oxide and, if necessary, other component A' are mixed in a suitable solvent to prepare a solution or a slurry (a) containing cerium oxide and, if necessary, other component A'. Here, the solvent is not particularly limited, so long as it can dissolve or suspend cerium oxide and, if necessary, other component A', but preferably water is used. In addition, in this case, concentration of cerium oxide in the solvent, concentration of other component A' in the solvent when other component A' is used and mixing ratio with cerium oxide, and the like can be suitably adjusted so that the lower layer as described above is prepared. Here, the above solution or slurry (a) can be treated by wet milling using ball mill or the like, if necessary.

Next, a monolithic support is dipped into the resulting solution or slurry (a), and extra solution or slurry (a) is removed. Here, explanation for the monolithic support is omitted because described above. In the above step, dipping condition is not particularly limited, so long as cerium oxide and, if necessary, other component A' can be coated in the amounts described above. For example, the monolithic support is, after dipped into the above solution or slurry (a), dried at 100 to 150° C. for 10 minutes to 1 hour. Subsequently, the resultant dry support is calcined at 400 to 800° C. for 1 to 3 hours to obtain a monolithic support coated at the lower layer containing catalytic component A (hereinafter, also called as "lower-layer-coated monolithic support".

Separately, specified amounts of catalytic component B-1, B-2 and, if necessary, other component B' are mixed in a suitable solvent to prepare a solution or a slurry (b) containing catalytic components B-1, B-2 and, if necessary, other component B'. Here, the solution or a slurry (b) may be prepared simply by mixing catalytic components B-1, B-2 and, if necessary, other component B', but preferably, after catalytic component B-2 is dispersed in or supported on catalytic component B-1, such supported material is mixed with other component B' in each specified amount, to prepare a solution or a slurry (b).

Here, the solvent is not particularly limited, so long as it can dissolve or suspend catalytic components B-1, B-2, or the material in which catalytic component B-2 is dispersed in or supported on catalytic component B-1, and, if necessary, other component B', and preferably water is used. In addition, in this case, concentration of the above each catalytic component B-1, B-2, in the solvent, concentration of other component B' in the solvent when other component B' is used and mixing ratio with catalytic components B-1, B-2, and the like can be suitably adjusted so that the upper layer as described above is prepared.

Method for dispersing/supporting catalytic component B-2 in/on catalytic component B-1 is not particularly limited, and any known production method for catalyst can be applied after suitably modified if necessary. Specifically, catalytic component B-1 (zeolite) is added to the aqueous solution or aqueous slurry containing catalytic component B-2, and sufficiently mixed. After that, the mixture is dried, for example, at 100 to 150° C. for 10 to 20 hours. Subsequently, after drying the powder from which moisture has been removed, the powder is calcined at 400 to 800° C. for 1 to 3 hours to obtain a material in which catalytic component B-2 is dispersed/supported in/on catalytic component B-1. A solution or a slurry (b) is prepared by mixing this specified amount of the material with other component B' in a suitable solvent, if necessary. In this connection, the above solution or slurry (b) can be treated by wet milling using ball mill or the like, if necessary.

Next, the lower-layer-coated monolithic support produced as described above is dipped into the solution or the slurry (b) prepared as described above, and extra solution or slurry (b) is removed. Here, dipping condition of the lower-layer-coated monolithic support is not particularly limited, so long as the desired catalytic components (catalytic components B-1, B-2 or the supported material in which catalytic component B-2 is dispersed/supported in/on catalytic component B-1, and, if necessary, other component B', hereinafter, same as above) can be coated in such amounts as described above. For example, the lower-layer-coated monolithic support is dipped into the above solution or slurry (b), then dried at 100 to 150° C. for 10 minutes to 1 hour. After that, by drying the dry powder from which moisture has been thus removed, directly all day and night, and calcining the powder at 400 to 800° C. for 1 to 3 hours, the lower-layer-coated monolithic support is coated with the upper layer containing catalytic component B, and the catalyst for removing nitrogen oxides of the present invention can be thus produced.

In the catalyst for removing nitrogen oxides of the present invention described above, catalytic component B in the upper layer catalyzes the oxidation reaction and accelerates to oxidize efficiently nitrogen oxides, in particular, nitric oxide (NO) to nitrogen dioxide ($NO_2$), and cerium oxide in the lower layer adsorbs the thus generated nitrogen dioxide. In addition, the catalyst for removing nitrogen oxides of the present invention can exhibit sufficient catalytic activity even in such a low temperature range as around 100° C., for example, 80 to 150° C. For this reason, by using the catalyst of the present invention, amount of nitrogen oxides (NOx) in an exhaust gas can be significantly reduced/removed.

Therefore, the present invention includes a method for removing nitrogen oxides in an exhaust gas using the catalyst for removing nitrogen oxides of the present invention. That is, second aspect of the present invention is to provide a method for removing nitrogen oxides in an exhaust gas, which contacts the catalyst for removing nitrogen oxides of the present invention with an exhaust gas containing nitrogen oxides.

5. Method for Removing Nitrogen Oxides in Exhaust Gas

By using the catalyst for removing nitrogen oxides of the present invention, an exhaust gas from internal combustion engines such as diesel engine, gasoline engine can be purified. In particular, the catalyst of the present invention is superior in the purifying performance for NOx in an exhaust gas from diesel engines starting at a low temperature.

In the method of the present invention, purification of exhaust gas is performed by placing the catalyst for removing nitrogen oxide of the present invention in the exhaust gas. Alternatively, the catalyst for removing nitrogen oxide of the present invention may be used in combination with at least one of other catalysts. In this case, the other catalysts include, for example, known oxidation catalyst for adsorbing hydrocarbons or for removing nitrogen oxides, ternary catalyst, and the like. By combining the catalyst of the present invention with other catalyst in such way, it is possible to remove effectively hydrocarbons, carbon monoxide and soot in addition to nitrogen oxides in an exhaust gas.

When the catalyst of the present invention is used in combination with other catalyst, locations where the catalyst of the present invention and other catalyst are placed is not particularly limited, and any of the following cases may be employed: the catalyst of the present invention is placed in the upstream side of an exhaust gas, and other catalyst is placed in the downstream side of an exhaust gas; or the catalyst of the present invention is placed in the downstream side of an exhaust gas, and other catalyst is placed in the upstream side of an exhaust gas. Preferably, the catalyst for removing nitrogen oxides of the present invention is placed in the downstream side of an exhaust gas, and other catalyst, in particular, at least one of oxidation catalyst and ternary catalyst is placed in the upstream side of an exhaust gas.

The exhaust gas to be treated with the catalyst of the present invention is an exhaust gas containing nitrogen oxides exhausted from internal combustion engines such as diesel engine, gasoline engine. Amount of nitrogen oxides in the exhaust gas is not particularly limited, but the catalyst of the present invention is preferably used for treatment of the exhaust gas in which content of nitrogen oxide in the exhaust gas is preferably 2,000 ppm by volume or less.

The ternary catalyst, which is preferably used when the catalyst of the present invention is used in combination with other catalyst, is not particularly limited, and any of those to be used as a catalyst, which can usually treat HC, NOx and CO simultaneously, may be used, and known ternary catalysts can be used. Preferably, in the ternary catalyst, a catalytically active component is supported on a refractory inorganic oxide (preferably, porous refractory inorganic oxide). Here, the refractory inorganic oxide is not particularly limited, and known refractory inorganic oxides can be used. Specifically, the refractory inorganic oxide includes those having high surface area such as activated alumina, silica, zirconia, titania, ceria, or complex oxides thereof and the like. Among them, activated alumina, zirconia and ceria are preferable, and activated alumina is particularly preferable. In addition, the above refractory inorganic oxide may be used alone or in a mixture of two or more kinds.

In addition, the catalytically active component to be used in the ternary catalyst includes platinum, rhodium, palladium, and mixtures thereof. Preferably platinum and rhodium, palladium and rhodium, or palladium, rhodium and platinum, and more preferably palladium and rhodium are used. In particular, those, in which noble metals of Pt—Rh, Pd—Rh, Pt—Pd—Rh series are supported on a porous inorganic oxide, are preferably used.

In addition, the ternary catalyst can contain other additive component, and the additive component includes rare earth metals such as scandium (Sc), yttrium (Y), lanthanum (La), cerium (Ce), praseodymium (Pr), neodymium (Nd), and the like; metals such as zirconium (Zr), iron (Fe), cobalt (Co), nickel (Ni), and the like; oxides of the above metals; complex oxides of the above metals; and the like. Among them, oxides of Zr, Ce, La, Y, Nd and Pr or complex oxides thereof are preferable, and oxides of Zr, Ce and La or complex oxides thereof are more preferable.

Here, the ternary catalyst is used in a coated form on the monolithic support. In this case, since the monolithic support is not particularly limited, and same to the monolithic support according to the present invention described above, explanation is omitted here.

Amount of the ternary catalyst to be coated (supported) on the monolithic support is not particularly limited, and similar amount to the amount of the known ternary catalyst to be coated (supported) can be used.

The oxidation catalyst to be preferably used when the catalyst of the present invention is used in combination with other catalyst is not particularly limited, and any of those used as an oxidation catalyst, which can usually oxidize HC and CO may be used, and known oxidation catalysts, can be used. Preferably, in the oxidation catalyst, a catalytically active component is supported on a refractory inorganic oxide (preferably, porous refractory inorganic oxide). For example, noble metals such as platinum, palladium, rhodium and refractory inorganic oxides, in particular, alumina, silica, zirconia, titania, or complex oxides thereof can be used. Preferably, noble metals (catalytically active component) of platinum and/or palladium and refractory inorganic oxides of alumina, titania, silica, zirconia, or complex oxides thereof are included. Further, one or more kinds of rare earth metal oxides such as lanthanum oxide ($La_2O_3$) and metals such as iron, cobalt, nickel are sometimes added.

Here, the oxidation catalyst can be used in a coated form on the monolithic support. In this case, since the monolithic support is not particularly limited, and same to the monolithic support according to the present invention described above, explanation is omitted here.

Amount of the oxidation catalyst to be coated (supported) on the monolithic support is not particularly limited, and similar amount to the amount of the known oxidation catalyst to be coated (supported) can be used. A volume ratio of the catalyst of the present invention and the oxidation catalyst and/or the ternary catalyst (ratio of volume of the catalyst of the present invention: total volume of the oxidation catalyst and the ternary catalyst) is preferably 1:0.5 to 2.

Nitrogen oxides in an exhaust gas are removed by contacting the catalyst of the present invention with an exhaust gas containing nitrogen oxides (in particular, nitric oxide). Conditions when this treatment is carried out are not particularly limited, and the treatment can be carried out by suitably selecting optimum conditions. For example, space velocity of exhaust gas (volume of passing exhaust gas per unit volume of catalyst in one hour) is generally 5,000 to 200,000 $hr^{-1}$ (STP), and preferably 5,000 to 50,000 $hr^{-1}$ (STP). In addition, temperature at which the catalyst of the present invention is contacted with the exhaust gas containing nitrogen oxides (in particular, nitric oxide) is preferably 80 to 150° C. The catalyst of the present invention can exhibit sufficient catalytic activity even when the contacting temperature with exhaust gas is as low as described above.

EXAMPLES

Effects of the present invention will be described using the following Examples and Comparative Examples. In this regard, however, it is not to say that the technical scope of the present invention is limited only to the following Examples.

Example 1

After a suspension containing cerium oxide (BET specific surface area: 250 $m^2$/g, average particle diameter: 15 μm) (147 g) and silica sol (produced by Nissan Chemical Ind. Ltd., Snowtex O) (37 g) in water was sufficiently mixed, wet milling was carried out for 14 hours using a ball mill, to prepare slurry A.

Into the resultant slurry A, a cordierite-made honeycomb support (400 cells/$inch^2$) having a size of diameter 24 mm×length 66 mm was dipped. Subsequently, after extra slurry A was removed, the support was dried by blowing in a horizontal state, followed by calcining at 500° C. for 1 hour, to obtain catalyst A in which the support is coated with the lower layer including cerium oxide and silica as catalytic component A. The resultant catalyst A was found to contain cerium oxide (95 g) and silica (5 g) per 1 liter of support, respectively.

Separately, β-zeolite (Zeolite beta produced by Zeolyst, $SiO_2/Al_2O_3$ (molar ratio)=25) (225 g) was poured to an aqueous solution of ferric nitrate.nonahydrate (49 g). After sufficiently mixing, the mixture was dried at 120° C. for 16 hours, then further calcined at 500° C. for 1 hour, to obtain iron/zeolite powder having the dispersed and supported catalytic components. The resultant powder (171 g) was poured into an aqueous solution containing silica sol (produced by Nissan Chemical Ind. Ltd., Snowtex O) (160 g) and the mixture was sufficiently mixed, to obtain a suspension. After that, wet milling was carried out for 14 hours for the resultant suspension using a ball mill, to prepare slurry B.

Into the resultant slurry B, catalyst A obtained as described above was dipped. Subsequently, after extra slurry B was removed, catalyst A was dried by blowing in horizontal state, followed by calcining at 500° C. for 1 hour, to obtain catalyst for removing nitrogen oxides of the present invention (1) in which the lower layer containing iron, silica and β-zeolite as catalyst component B was further coated with catalyst A.

As the result, the lower layer of the resultant catalyst for removing nitrogen oxides (1) was found to contain cerium oxide (95 g) and silica (5 g) per 1 liter of support, respectively. Further, the upper layer of the catalyst for removing nitrogen oxides (1) was found to contain β-zeolite (150 g), silica (30 g) and iron (7 g, converted to ferric oxide) per 1 liter of support, respectively.

Example 2

After a suspension containing cerium oxide (BET specific surface area: 250 $m^2$/g, average particle diameter: 15 μm) (101 g) and alumina (γ-$Al_2O_3$, BET specific surface area: 150 $m^2$/g, produced by SASOL) (51 g) in water was sufficiently mixed, wet milling was carried out for 14 hours using a ball mill, to prepare slurry A.

Into the resultant slurry A, a cordierite-made honeycomb support (400 cells/$inch^2$) having a size of diameter 24 mm×length 66 mm was dipped. Subsequently, after extra slurry A was removed, the support was dried by blowing in a horizontal state, followed by calcining at 500° C. for 1 hour, to obtain catalyst A in which the support is coated with the lower layer including cerium oxide and alumina as catalytic component A. The resultant catalyst A was found to contain cerium oxide (75 g) and alumina (25 g) per 1 liter of support, respectively.

Separately, β-zeolite (Zeolite beta produced by Zeolyst, $SiO_2/Al_2O_3$ (molar ratio)=25) (225 g) was poured to an aqueous solution of ferric nitrate.nonahydrate (49 g). After sufficiently mixing, the mixture was dried at 120° C. for 16 hours, then further calcined at 500° C. for 1 hour, to obtain iron/zeolite powder having the dispersed and supported catalytic components. The resultant powder (171 g) was poured into an aqueous solution containing silica sol (produced by Nissan Chemical Ind. Ltd., Snowtex O) (160 g) and the mixture was sufficiently mixed, to obtain a suspension. After that, wet milling was carried out for 14 hours for the resultant suspension using a ball mill, to prepare slurry B.

Into the resultant slurry B, catalyst A obtained as described above was dipped. Subsequently, after extra slurry B was removed, catalyst A was dried by blowing in horizontal state, followed by calcining at 500° C. for 1 hour, to obtain catalyst for removing nitrogen oxides of the present invention (2) in which the lower layer containing iron, silica and β-zeolite as catalyst component B is further coated with catalyst A.

As the result, the lower layer of the resultant catalyst for removing nitrogen oxides (2) was found to contain cerium oxide (75 g) and alumina (25 g) per 1 liter of support, respectively. Further, the upper layer of the catalyst for removing nitrogen oxides (2) was found to contain β-zeolite (150 g), silica (30 g) and iron (7 g, converted to ferric oxide) per 1 liter of support, respectively.

Comparative Example 1

After a suspension containing cerium oxide (BET specific surface area: 250 m²/g, average particle diameter: 15 μm) (147 g) and silica sol (produced by Nissan Chemical Ind. Ltd., Snowtex O) (37 g) in water was sufficiently mixed, wet milling was carried out for 14 hours using a ball mill, to prepare slurry A.

Into the resultant slurry A, a cordierite-made honeycomb support (400 cells/inch²) having a size of diameter 24 mm×length 66 mm was dipped. Subsequently, after extra slurry A was removed, the support was dried by blowing in a horizontal state, followed by calcining at 500° C. for 1 hour, to obtain comparative catalyst for removing nitrogen oxides (1) in which the support is coated only with catalyst component A layer containing cerium oxide and silica as catalytic component A. The resultant comparative catalyst for removing nitrogen oxides (1) was found to contain cerium oxide (95 g) and silica (5 g) per 1 liter of support, respectively.

Comparative Example 2

β-Zeolite (Zeolite beta produced by Zeolyst, $SiO_2/Al_2O_3$ (molar ratio)=25) (225 g) was poured to an aqueous solution of ferric nitrate.nonahydrate (49 g). After sufficiently mixing, the mixture was dried at 120° C. for 16 hours, then further calcined at 500° C. for 1 hour, to obtain iron/zeolite powder having the dispersed and supported catalytic components. The resultant powder (171 g) was poured into an aqueous solution containing silica sol (produced by Nissan Chemical Ind. Ltd., Snowtex O) (160 g) and the mixture was sufficiently mixed, to obtain a suspension. After that, wet milling was carried out for 14 hours for the resultant suspension using a ball mill, to prepare slurry B.

Into the resultant slurry B, a cordierite-made honeycomb support (400 cells/inch²) having a size of diameter 24 mm×length 66 mm was dipped. Subsequently, after extra slurry A was removed, the support was dried by blowing in a horizontal state, followed by calcining at 500° C. for 1 hour, to obtain comparative catalyst for removing nitrogen oxides (2) in which the support is coated only with catalyst component B layer containing iron, silica and β-zeolite as catalytic component B. The resultant comparative catalyst for removing nitrogen oxides (2) was found to contain β-zeolite (150 g), silica (30 g) and iron (7 g, converted to ferric oxide) per 1 liter of support, respectively.

Comparative Example 3

Slurry A prepared in Comparative Example 1 and slurry B prepared in Comparative Example 2 were mixed in a ratio of 1:1.87 by solid content, to prepare a slurry mixture.

Into the resultant mixture, a cordierite-made honeycomb support (400 cells/inch²) having a size of diameter 24 mm×length 66 mm was dipped. Subsequently, after extra mixture C was removed, the support was dried by blowing in a horizontal state, followed by calcining at 500° C. for 1 hour, to obtain comparative catalyst for removing nitrogen oxides (3) in which the support was coated only with catalyst mixture layer containing cerium oxide, silica, β-zeolite, and iron as the catalyst mixture containing catalytic component A and catalytic component B mixed together. The resultant comparative catalyst for removing nitrogen oxides (3) was found to contain cerium oxide (95 g), silica (35 g), β-zeolite (150 g) and iron (7 g, converted to ferric oxide) per 1 liter of support, respectively.

[Blank]

In order to estimate adsorption amount of NOx adsorbed on the catalysts, a cordierite-made honeycomb support (400 cells/inch²) having a size of diameter 24 mm×length 66 mm which had not been coated with a catalyst was used as a blank.

(Test Method for Exhaust Gas Purification Performance)

For the catalysts produced in Examples and Comparative Examples, their exhaust gas purification performances were tested according to the following method.

Firstly, using the catalysts having a size of diameter 24 mm×length 66 mm, hydrothermal durability treatment was carried out under the following conditions.

TABLE 1

| <Hydrothermal durability treatment conditions> |
| --- |
| 700° C. × 50 hours Atmosphere: $O_2$ 10% by volume, $H_2O$ 10% by volume, $N_2$ Balance |

Next, size of the catalyst after the above hydrothermal durability treatment was made to be diameter 24 mm×length 66 mm, and the catalyst was packed in a stainless-steel-made catalytic reaction tube, and the following mixed gas was allowed to flow through the catalyst. Catalyst inlet temperature in the reaction tube was controlled using a heater depending on the pretreatment conditions and each evaluation conditions described in the following Table 2. In both of the evaluation conditions 1 and 2, after catalysts were treated under the above pretreatment conditions, catalyst inlet temperature was adjusted at 100° C. Evaluation was started after the temperature was stabilized. After 1 minute from start, NO and $NH_3$ (only in evaluation condition 2) were introduced.

TABLE 2

| <Catalyst treatment conditions> |
| --- |
| Gas amount: 16 NL/min. Catalyst inlet temperature: 600° C. × 5 min., $O_2$ 12% by volume, $CO_2$ 6% by volume, $H_2O$ 6% by volume, $N_2$ Balance. [Evaluation condition 1 (NO adsorption test)] |
| NO 180 ppm, $O_2$ 12% by volume, $CO_2$ 6% by volume, $H_2O$ 6% by volume, $N_2$ Balance. Catalyst inlet temperature: 100° C. |

TABLE 2-continued

<Catalyst treatment conditions>

[Evaluation condition 2 (NH₃ and NO adsorption test)]

$NH_3$ 180 ppm, NO 180 ppm, $O_2$ 12% by volume, $CO_2$ 6% by volume, $H_2O$ 6% by volume, $N_2$ Balance.
Catalyst inlet temperature: 100 to 300° C.

And, NOx concentrations in the gas at the catalyst exit under these conditions were measured by a chemiluminescence detector (CLD). Results of evaluation condition 1 and evaluation condition 2 are shown in FIG. 1 and FIG. 2, respectively.

(Calculation of NOx Adsorption Amount)

NOx adsorption amount was calculated from the results obtained under the above evaluation condition 1. Concerning an integrated value of the NOx concentration up to 300 sec., the value obtained by subtracting the integrated value of emitted NOx concentration of the catalyst prepared in each of Examples and Comparative Examples from the integrated value of emitted NOx concentration in the support for blank was termed as X. And NOx adsorption amount (mmol/L of catalyst) in this case was calculated by the following equation.

$$NOx \text{ adsorption amount } (mmol/L_{cat}) = \frac{16 \, (L/\text{min}) \times X(ppm \cdot \text{sec}) \times 10^{-6} \, (l/ppm) \times 10^3 \, (mmol/mol)}{60 \, (\text{sec/min}) \times 22.4 \, (L/mol) \times 0.03 \, (L_{cat})}$$ [Equation 1]

Results are shown in FIG. 3.

From FIG. 3, it can be understood that both of comparative catalysts for removing nitrogen oxides (1) and (2) cannot adsorb NOx at 100° C., whereas catalysts for removing nitrogen oxides of the present invention (1) and (2) can significantly adsorb NOx even at such a low temperature as 100° C.

In this connection, the present application is based on Japanese Patent Application No. 2007-280253, the disclosure of which is incorporated herein in entirety by reference.

Figure 1:
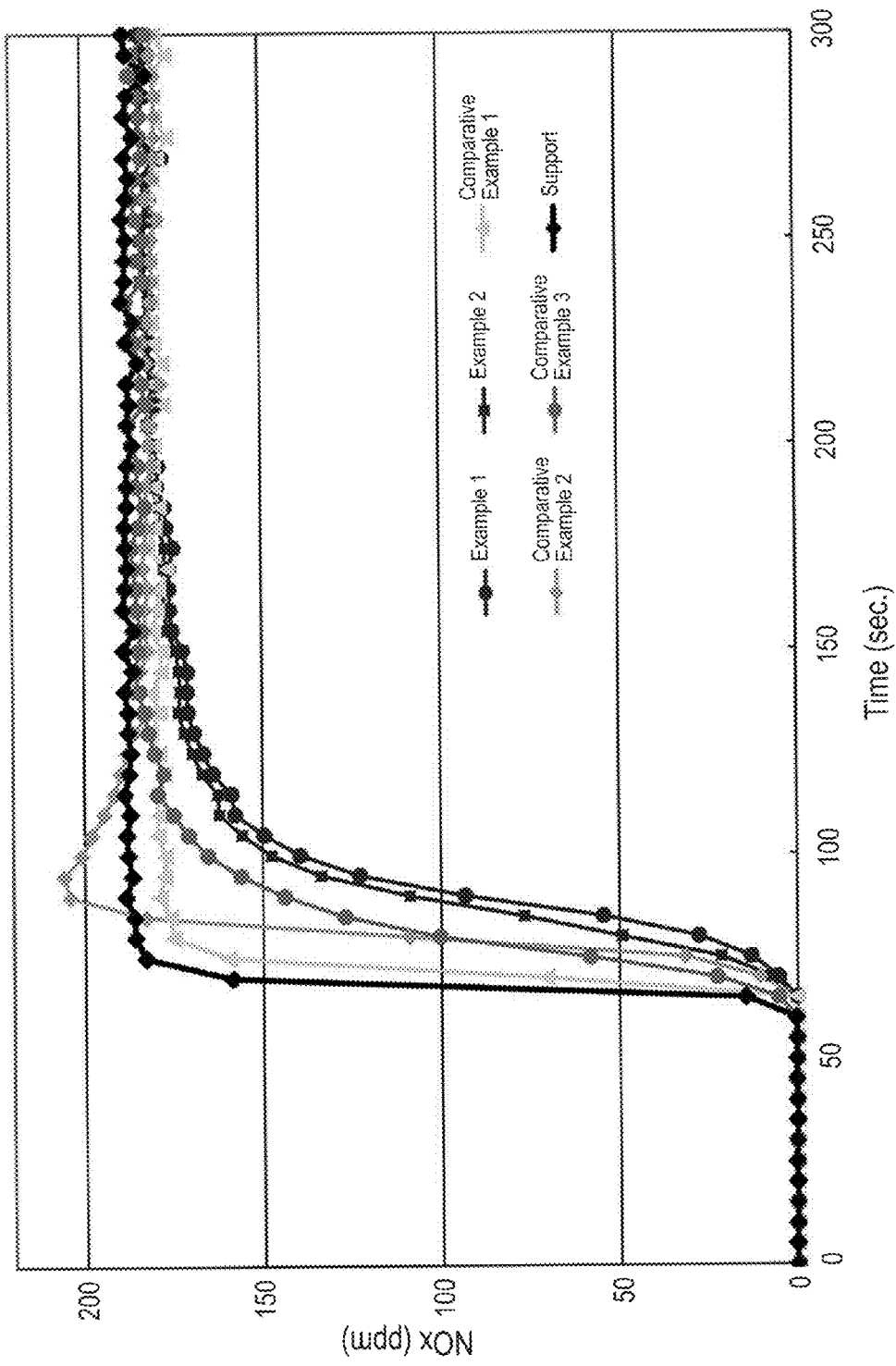
FIG. 1 is a chart showing the state in which nitrogen oxides in the exhaust gas are removed using the catalyst according to the present invention. The left side of vertical axis represents emission amount of NOx (lower NOx value shows more NOx adsorbed), and horizontal axis represents time course of the treatment process.
Figure 2:
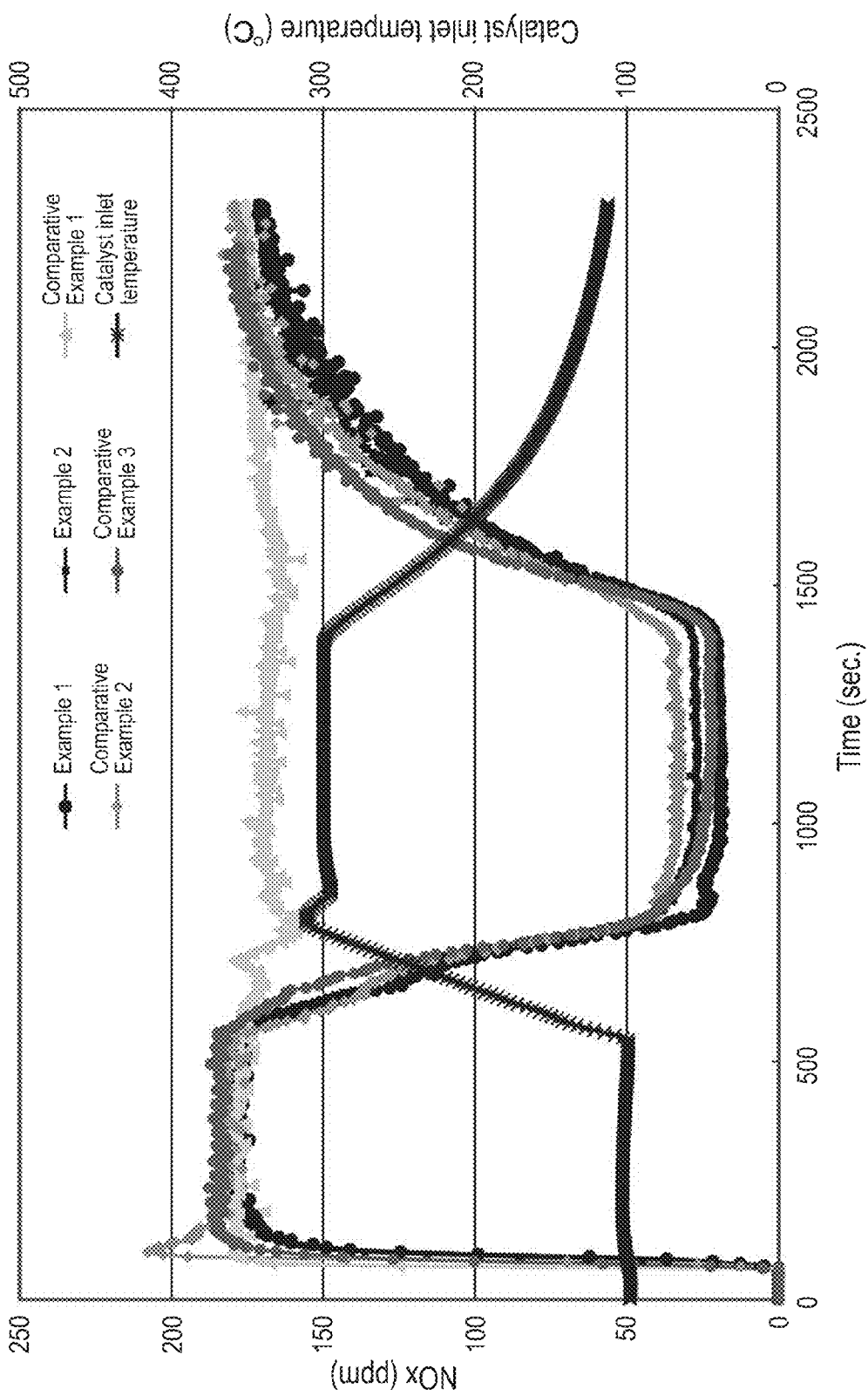
FIG. 2 is a chart showing the state in which nitrogen oxides in the exhaust gas are removed using the catalyst according to the present invention. The right side of vertical axis in represents exhaust gas temperature, vertical axis in the left side represents emission amount of NOx (lower NOx value shows more NOx adsorbed), and horizontal axis represents time course of the treatment process.
Figure 3:
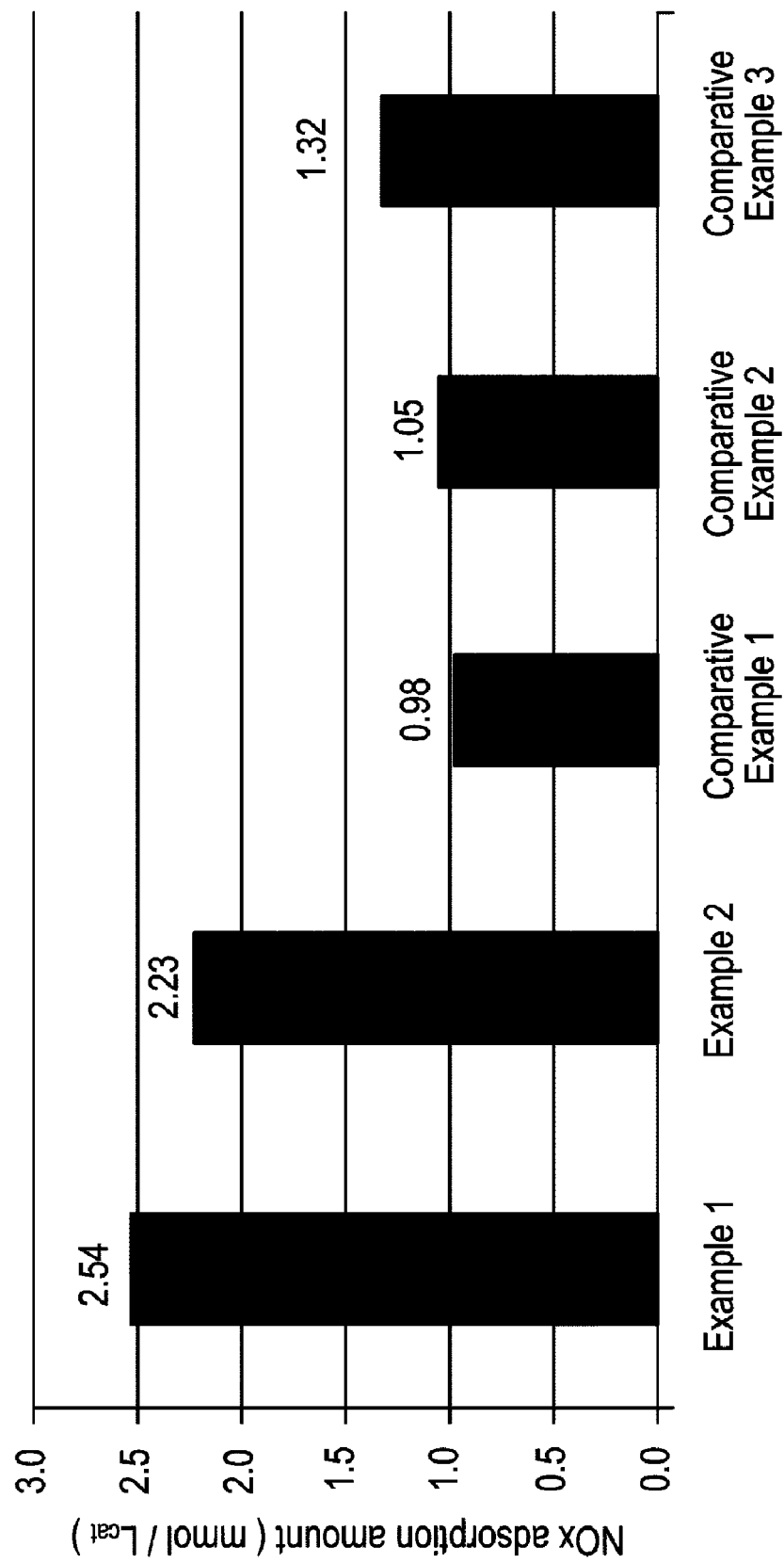
FIG. 3 is a graph showing adsorption amounts of NOx at 100° C. when the catalysts according to the present invention are used.

The invention claimed is:

1. A catalyst for removing nitrogen oxides comprising a monolithic support coated with (a) a lower layer containing catalytic component A comprising cerium oxide and at least a refractory inorganic oxide wherein the content of the refractory inorganic oxide contained in said catalytic component A is 2 to 100 parts by mass relative to 100 parts by mass of cerium oxide, and (b) an upper layer containing catalytic component B comprising (b-1) at least one metal selected from a group consisting of copper, manganese, iron, cobalt and nickel or a metal compound thereof, (b-2) zeolite, wherein the content of the metal or the metal compound (the metal/metal compound) contained in the upper layer is 1.0 to 30.0 parts by mass relative to 100 parts by mass of zeolite, and (b-3) at least a refractory inorganic oxide, wherein the content of said refractory inorganic oxide in the upper layer is 10-100 parts by mass relative to 100 parts by mass of the total of the metal/metal compound and zeolite.

2. The catalyst for removing nitrogen oxides according to claim 1, wherein the content of said catalytic component A is 10 to 100 parts by mass relative to 100 parts by mass of said catalytic component B.

3. The catalyst for removing nitrogen oxides according to claim 1, wherein said refractory inorganic oxide is selected from a group consisting of aluminium oxide, silicon oxide, phosphorus oxide, titanium oxide and zirconium oxide.

4. The catalyst for removing nitrogen oxides according to claim 1, wherein the content of said catalytic component A is 50 to 150 g per 1 liter of the monolithic support, and the content of said catalytic component B is 150 to 250 g per 1 liter of the monolithic support.

5. The catalyst for removing nitrogen oxides according to claim 2, wherein the refractory inorganic oxide is selected from a group consisting of aluminum oxide, silicon oxide, phosphorus oxide, titanium oxide and zirconium oxide.

6. A method for removing nitrogen oxides in an exhaust gas, wherein an exhaust gas containing nitrogen oxides is contacted with the catalyst for removing nitrogen oxides according to claim 1.

7. The method for removing nitrogen oxides in an exhaust gas according to claim 6, wherein the catalyst for removing nitrogen oxides is placed in the downstream side of the exhaust gas, and at least one of an oxidation catalyst and a ternary catalyst is placed in the upstream side of the exhaust gas.

8. The method for removing nitrogen oxides in an exhaust gas according to claim 6, wherein the exhaust gas containing nitrogen oxides with a temperature of 80 to 150° C. is contacted with said catalyst for removing nitrogen oxides.

9. The method for removing nitrogen oxides in an exhaust gas according to claim 6, wherein said exhaust gas is exhausted from a diesel engine.

* * * * *